Nov. 4, 1952
E. ERNST
2,616,105
SCREWSTOCK
Filed Sept. 13, 1948
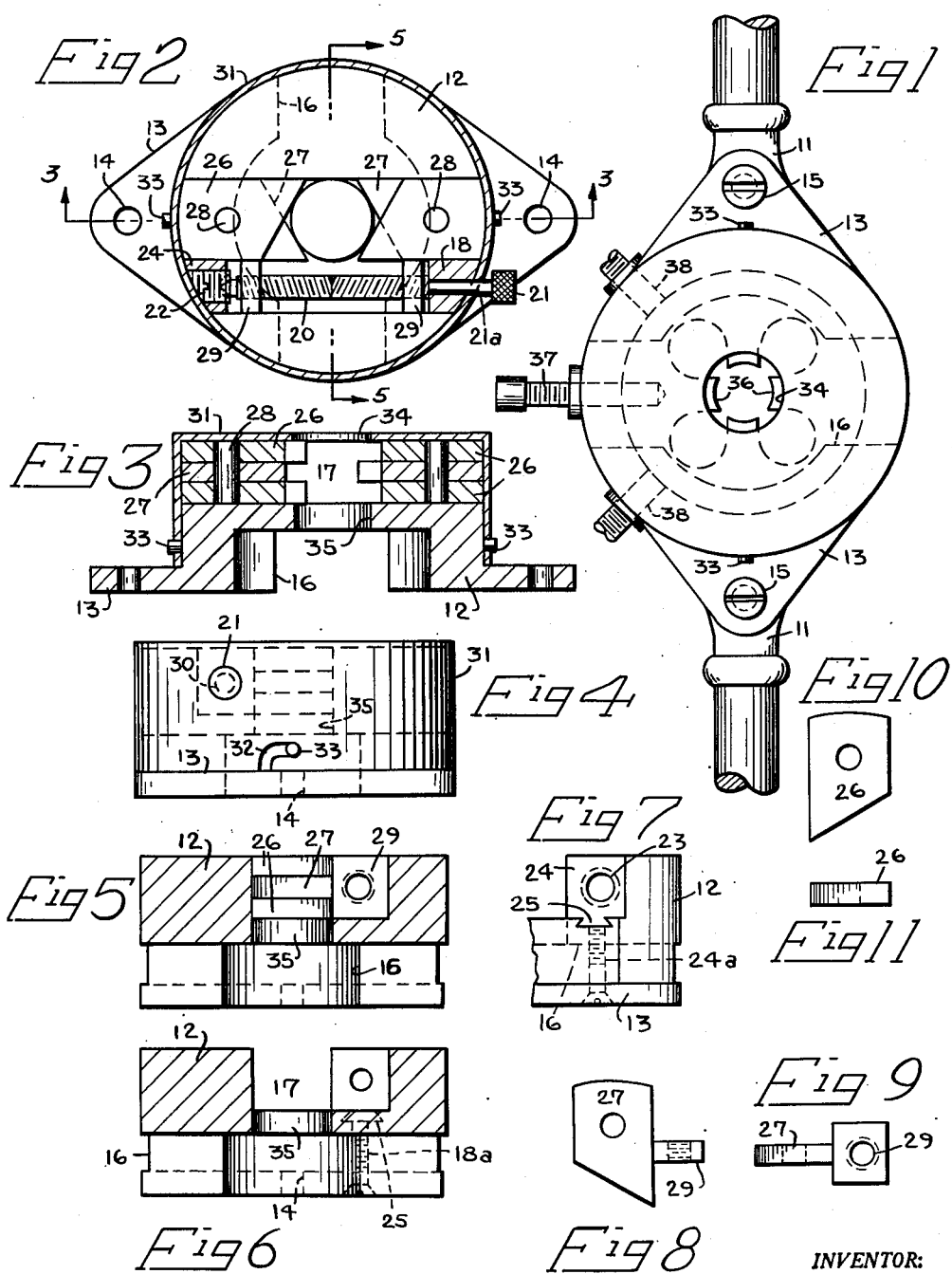
INVENTOR:
EDOUARD ERNST,
BY
HIS AGENT.

Patented Nov. 4, 1952

2,616,105

UNITED STATES PATENT OFFICE 2,616,105

SCREWSTOCK

Edouard Ernst, Zurich, Switzerland

Application September 13, 1948, Serial No. 48,950
In Switzerland September 12, 1947

4 Claims. (Cl. 10—127)

(Granted under the provisions of sec. 14, act of
March 2, 1927; 357 O. G. 5)

The invention relates to a screw-stock fitted with a guide for the work and represents a novelty in as much as to the die-stock a detachable guide is fitted on its turn with two guiding jaws which by means of a right- and left-handed screw can simultaneously be approached or separated and in as much as the guiding device itself is covered by a cap with a central opening for the work and which holds the guiding jaws in position.

The invention will best be understood by reference to the accompanying drawing in which:

Fig. 1 is a plan view of the guiding device fixed to the screw-stock;

Fig. 2 is a plan view of the guiding device with the bottom of the cap cut off;

Fig. 3 is a sectional view taken along the line 3—3 of Fig. 2;

Fig. 4 is a side elevational view of the guiding device;

Fig. 5 is a sectional view taken along the line 5—5 of Fig. 2 with the cap taken off;

Fig. 6 is a sectional view similar to Fig. 5 but with the cap and the guiding jaws taken away;

Fig. 7 is an end elevational view of one of the halves of the guiding device with the cap taken off;

Figs. 8 and 9 are a plan view, and an end elevational view, respectively, of the flat portion of a guiding jaw; and Figs. 10 and 11 are a plan view, and an end elevational view, respectively, of another flat portion of the guiding jaw.

In the drawing, 11 is the body of a known screw-stock to which the guide for the work is detachably fixed. The guiding piece is a cylindrical body 12 with two opposite flanges 13 on its diameter perforated at 14 for the screw 15 by means of which it will be fixed to the stock-body 11.

In the lower portion of the piece 12 facing the stock-body, there is provided a transversal recess 16 through which the chips can drop or be removed. Into the top portion of the piece 12 off the stock-body 12 a rectangular recess 17 is cut, into which a guide-block 18 is arranged (Figs. 2 and 6). The guide-block 18 is perforated at 19 for journalling the shouldered end of a right- and left-hand threaded spindle or screw 20 and at the same time serves as a stop for the screw-shoulder. A shaft 21a arranged on the end of the screw 20 projects beyond the guide-block 18 and is connected to a head 21 (Figs. 2 and 4). The other end of the screw 20 is pointed and bears on a depression in the end of the slotted adjusting screw or stud 22 which acts as a pointed journal bearing. The slotted screw 22 is screwed into a bore 23 of a guide-block 24 (Figs. 2 and 7) and is axially adjustable. The guide-block 24 has a dovetail projection 25 which is slidable in a corresponding slot cut into the bottom of the slot 17. This guide-block 24 is fixed in position by means of a screw 24a introduced from below. Also the guide-block 18 has a dovetail projection 25 and is slidable in a corresponding slot cut into the bottom of the slot 17. The guide-block 18 is secured in position by means of a screw 18a introduced from below (Fig. 6).

In the slot 17 there are slidably arranged two guiding jaws each one being built up of two similar plates 26 (Figs. 10 and 11) and an intermediate plate 27 (Figs. 8 and 9). From one of the longitudinal edges of each of the two intermediate plates 27 a crest 29 projects which is threaded for the adjusting screw 20 (Fig. 2). The three plates 26 and 27 respectively of each guiding jaw are held together by a pin 28. Further are they cut and arranged in such a manner as to face and guide the work by angular ends while allowing of being approached so closely that they will touch each other over their full end-surface in telescoping arrangement of the guiding jaws. The body 12 with the two guiding jaws and the adjusting screw 20 are covered by a cap 31 which holds the two guiding jaws down in the slot 17 and into which two angular slots 32 are cut so that the cap may be slipped over the holding studs 33 the body 12 is fitted with and tightened down like a bayonet-lock. Through an opening 30 in the cap 31 the shaft 21a of the adjusting screw 20 projects so that it can be operated by means of the head 21. For fixing the cap 31 to the body 12 two screws could alternatively be provided. Into the top of the cap 31 an opening 34 is cut the diameter of which must be in registry at least with the opening 35 in the bottom of the slot 17. Through the openings 34 and 35 the work can be passed for being threaded.

In order to prepare the screw-stock for being used, the guiding device is to be fixed in the working position shown in Fig. 1, by means of the screws 15 and slipped over the work to be threaded past the openings 34 and 35 respectively. By revolving the adjusting screw 20 the guiding jaws are to be approached until they bear on the work, whereupon the dies of the screw-stock may be adjusted for starting. Owing to the guiding jaws of the guiding device the screw-stock automatically is adjusted to and kept in the correct position with regard to the work, namely exactly at right angles to the work thus allowing for cutting centric and straight threads closely to the required diameter, or for pre-cutting, be it for finishing. After pre-cutting of the thread is done the guiding appliance may be taken off.

The guiding device is a simple construction and therefore cheap to manufacture and its guiding jaws can be adjusted from the open position, as shown in Fig. 2, down to close contact of their facing ends throughout their full extension thus allowing for cutting threads down to the smallest diameters. Since the adjusting screw at one side is supported with its pointed end in an axially adjustable stud 22, and at the other side bears on the guide-block 18, there is practically no axial play. Owing to that, both guiding jaws will simultaneously come in touch with the work and with the same pressure provided, however, its axis be coaxial with the axis of the guiding device.

The guiding jaws and the adjusting screw are covered by the cap 31 which effectively conceals from the outside and protects these operating parts against damage and from soiling.

Inside the stock-body 11 a die 36 with four cutters is lodged which can be fixed by means of a set-screw 37 and centered by means of further two screws 38. With the screws 37 and 38 released the die 36 can be taken out of the stock-body 11 and another die inserted in its stead, it not being necessary first to take off the guiding device.

In the case of the illustrated exemplification, each jaw is built up of three partial jaws 26 and 27 respectively. The number of these partial jaws, however, may be larger than three.

Having thus described my invention, I claim:

1. A screwstock having a body for receiving a tap cutting die, said body including handles and holding and adjusting means for said die, in combination with, work guide means secured to said body axially below said die and comprising a plate spaced from said body to allow for the discharge of cutting chips therebetween and having a work passage aperture aligned with said die, two oppositely disposed jaws movable to and from each other on said base for work guidance, and moving and holding means for said jaws including an axially shiftable spindle having right and left hand threaded portions supported adjacent said plate transversely of the axis of said die, a projection on each jaw having a threaded opening each engaging a spindle portion for opposite jaw movement upon spindle rotation, spindle shifting and positioning means movably connected to said plate for supporting said spindle in adjustable position relative to the die axis, and means operable for releasably locking said positioning means.

1. A screwstock having a body for receiving a tap cutting die, said body including handles and holding and adjusting means for said die, in combination with, work guide means secured to said body axially below said die and comprising a plate spaced from said body to allow for the discharge of cutting chips therebetween and having a work passage aperture aligned with said die, two oppositely disposed jaws movable to and from each other on said base for work guidance, and moving and holding means for said jaws including an axially shiftable spindle having right and left hand threaded portions supported adjacent said plate transversely of the axis of said die, a projection on each jaw having a threaded opening each engaging a spindle portion for opposite jaw movement upon spindle rotation, spindle shifting and positioning means movably connected to said plate for supporting said spindle in adjustable position relative to the die axis, means operable for releasably locking said positioning means, and a cover removably mounted on said work guide means and having an opening in alignment with said passage and arranged to press said jaws towards said plate and to limit outward movement of said jaws and to protect the parts of said guide means from soiling and against damage from accidental impact.

3. In a screwstock, the combination with a die supporting body having handles and die retaining means, of a work guide mechanism secured to said body and comprising a base, two oppositely movable work guiding jaws on said base, and means for positioning said jaws for work contact including a spindle supported adjacent said base transversely of the axis of said die and having right and left hand threaded portions, a projection on each jaw having a threaded opening each engaging an oppositely threaded spindle portion for jaw feeding upon spindle rotation, a support for supporting one end portion of said spindle being slidable axially of said spindle on said base, a second support for supporting the opposite end of said spindle being slidable axially of said spindle on said base and comprising a screw protruding from said second support and upon turning movable axially of said spindle and having a recess forming an end-bearing for said spindle, whereby the position of said spindle relative to the axis of the die can be adjusted by moving said supports, and the position between the spindle and the supports be adjusted for control of interplay by turning said screw, and means operable for releasably clamping said supports to said plate.

4. A work guide unit, for use in connection with a screw-stock having a die carrying body, said unit adapted to be quickly connected to, and disconnected from, said body and comprising in combination, a plate having a work passage aligned with the die axis upon mounting to said screwstock, two opposite aligned jaws movable to and from each other on said base, two oppositely aligned support elements adjacent said jaws and, independently, slidable relative to said base parallel to the direction of movement of said jaws, locking means operable for releasably clamping each element in all positions thereof to said plate, one of said elements forming a shaft bearing, a screw turnable in said other element and axially aligned with said bearing and having a recess to form an end-bearing, a spindle supported by said elements and having a shafted end engaged by said first bearing, and having a pointed opposite end engaged by said recess for adjustment of play between the spindle and the supports by turning of said screw, said spindle being shiftable axially with said elements and having right and left hand threaded portions intermediate said ends, and a projection on each jaw each having a threaded opening in engagement with a spindle portion for tied movement of said jaws upon spindle shifting and opposite jaw movement upon spindle rotation.

EDOUARD ERNST.

REFERENCES CITED

The following references are of record in the file of this patent:

UNITED STATES PATENTS

| Number | Name | Date |
|---|---|---|
| 997,665 | Fugere | July 11, 1911 |
| 1,241,377 | Hebert | Sept. 25, 1917 |
| 2,135,671 | Kuhn | Nov. 8, 1938 |

FOREIGN PATENTS

| Number | Country | Date |
|---|---|---|
| 61,257 | Germany | Feb. 27, 1892 |
| 630,831 | Germany | June 6, 1936 |